(12) United States Patent
Colonel et al.

(10) Patent No.: US 6,260,834 B1
(45) Date of Patent: Jul. 17, 2001

(54) PULLEY TENSIONER

(75) Inventors: Kenneth Colonel, Oviedo; Dwayne Tobin, Orlando, both of FL (US)

(73) Assignee: Datamax Corporation, Orlando, FL (US)

( * ) Notice: Subject to any disclaimer, the term of this patent is extended or adjusted under 35 U.S.C. 154(b) by 0 days.

(21) Appl. No.: 09/439,467

(22) Filed: Nov. 12, 1999

Related U.S. Application Data

(63) Continuation of application No. PCT/US98/09644, filed on May 11, 1998.
(60) Provisional application No. 60/046,538, filed on May 15, 1997.

(51) Int. Cl.[7] ................................. B41J 33/22; F16F 1/00
(52) U.S. Cl. ........................... 267/73; 267/174; 267/251; 400/234; 242/422.4
(58) Field of Search ................................... 400/234, 208, 400/208.1, 236, 242, 246; 267/73, 166, 174, 203, 251; 242/422.4, 422.8

(56) References Cited

U.S. PATENT DOCUMENTS

| 1,815,064 | * | 7/1931 | Legg | ................................. 242/422.4 |
| 3,842,620 | | 10/1974 | Scozzafava . | |
| 4,074,873 | * | 2/1978 | Hayashi et al. | ................... 242/422.8 |
| 4,797,690 | | 1/1989 | Takita et al. . | |
| 4,886,385 | | 12/1989 | Cappotto . | |
| 5,284,396 | * | 2/1994 | Masumura et al. | ................... 400/234 |

FOREIGN PATENT DOCUMENTS

| 60-124279 | | 7/1985 | (JP) . | |
| 63-297085 | * | 12/1988 | (JP) | ..................................... 400/234 |
| 5-193221 | | 8/1993 | (JP) . | |

\* cited by examiner

*Primary Examiner*—John S. Hilten
*Assistant Examiner*—Leslie J. Grohusky
(74) *Attorney, Agent, or Firm*—Dilworth & Barrese, LLP

(57) ABSTRACT

A pulley tensioner for applying torque or tension to a pulley includes a spring system configured to encircle the periphery of the pulley. The spring system is anchored to the pulley housing or some other fixed location. The spring system is made up of one or more coil springs which are wrapped around the periphery of the pulley. Where multiple springs are used, preferably each spring has a different spring constant and length. This allows the operator to select the desired tension depending upon the operating parameters of the printer. The applied tension may be further modified/tuned by using an additional spring member to anchor the spring system to the pulley housing or some other fixed location.

14 Claims, 4 Drawing Sheets

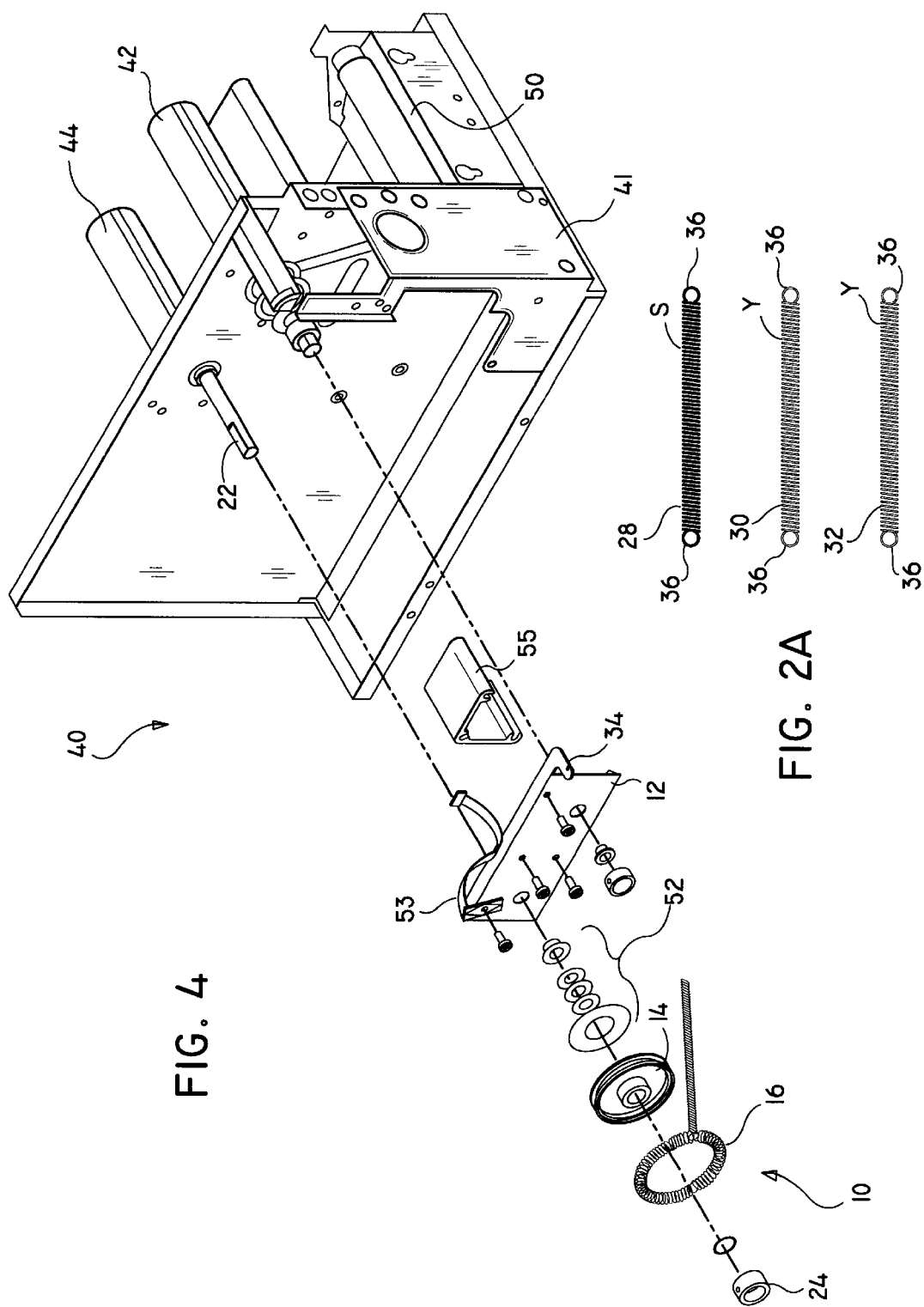

PULLEY TENSIONER

This is a continuation of copending application Ser. No. PCT/US98/09644 filed May 11, 1998.

CROSS-REFERENCE TO RELATED APPLICATIONS

This Patent Application claims the benefit of U.S. Provisional Application No. 60/046,538 filed May 15, 1997.

BACKGROUND

1. Technical Field

The present disclosure relates to tensioner apparatus. In particular, the disclosure relates to ribbon supply tensioners for use in printing apparatus.

2. Description of the Related Art

In modern printers, a variety of feed and take-up mechanisms are required to be driven and/or wound in order to transport printing media, ribbon, backings, etc. In most applications, these feed and take-up mechanisms require tensioning structure to maintain a desired amount of tension on the transport system and to minimize or eliminate roll out. One structure used in the art to provide tension is a clutch mechanism. Such a mechanism typically includes a friction plate intended to impart a predetermined torque to the feed and/or take-up mechanisms during operation. See, for example, U.S. Pat. No. 4,797,690. Although adequate for their intended function, these clutch mechanisms are typically expensive and require several assembly/adjustment steps to insure proper operation.

One simple and inexpensive tensioning mechanism is the wrapped coil spring developed by Fargo Electronics Inc. for a ribbon supply system in the Prodigy Plus™ thermal transfer printers. In that system, a single coil spring was wrapped around a pulley connected to the ribbon supply system. Each end of the spring was anchored to the housing such that about 180° of the periphery of the pulley was continually engaged by the spring. In this manner, a continuous tensioning was applied and was directly proportional to the spring constant K of the coil spring and the length of extension. While this system was adequate and inexpensive, it did not allow for adjustments for different media and gave little or no recoil when the pulley direction was reversed. Thus, wrinkling and/or tearing or the ribbon supply could result.

Accordingly, a need exists in the art for a simple, versatile, adjustable tensioning system which is configurable for different media and can impart a useful degree of recoil regardless of rotational direction.

SUMMARY

A pulley tensioner for applying torque or tension to a pulley is disclosed which includes a spring system configured to at least partially encircle the periphery of the pulley. The spring system is anchored to the pulley housing or some other fixed location by either an elastic or inelastic member. The spring system is made up of one or more coil springs which springs are wrapped at least partially around the periphery of the pulley. In one embodiment it is contemplated that each spring has a different spring constant and length. This allows the operator to select the desired tension depending on the operating parameters of the printer. The applied tension may be further modified or tuned by using one or more springs to anchor the spring system to the pulley housing or some other fixed location.

This novel system provides a versatile torque adjustment capability while increasing desirable recoil in either forward or reverse rotational directions.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages may best be understood by reference to the following description, taken in connection with the accompanying drawings, in which:

FIG. 2A is a plan view of color coded springs incorporating the spring system according to the present disclosure;

FIG. 4 is an exploded perspective view of a printing apparatus illustrating the pulley tensioner mounted to a pulley housing according to the present disclosure.

DETAILED DESCRIPTION OF PREFERRED EMBODIMENTS

Figure 1:
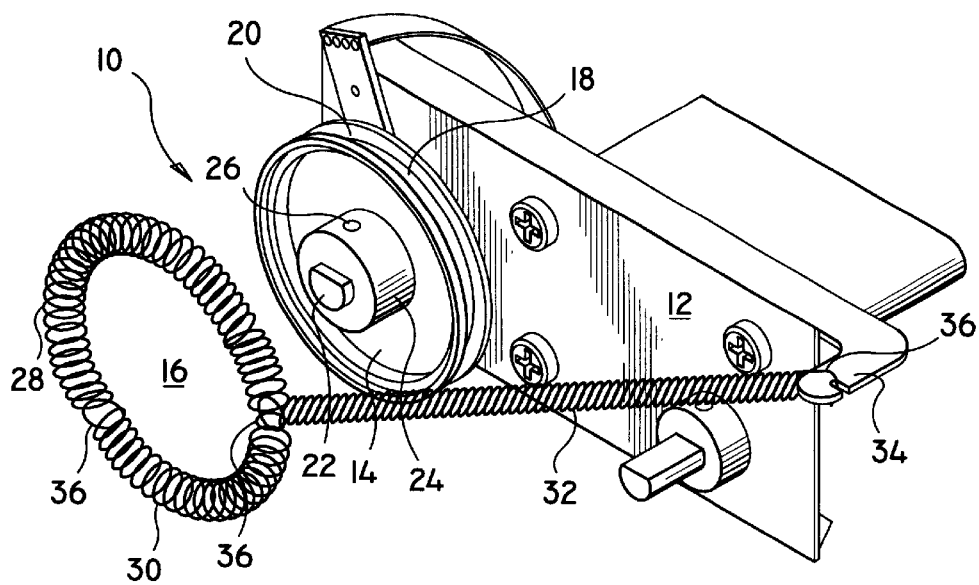
FIG. 1 is a perspective view illustrating the pulley member incorporating the novel torque adjustment structure according to the present disclosure.

Reference will now be made in detail to the preferred embodiments of the disclosure, which are illustrated in the accompanying figures. Turning now to the figures, wherein like components are designated by like reference numerals throughout the various figures, attention is first directed to FIGS. 1–3.

A pulley tensioner 10 in conjunction with a pulley housing 12 is shown having an annular pulley member 14 in a rotational relationship with spring system 16. Pulley member 14 includes an outer periphery 18 containing annularly spaced walls 20 for retaining spring system 16 therein. Pulley member 14 is rotationally coupled to pulley housing 12 through center hub portion 22 which rotates with pulley member 14 and is fixedly attached through a center of pulley member 14 by annular collar 24 and set screw 26. Pulley housing 12 includes a spring system attachment hook 34 for fixedly attaching spring system 16 to pulley housing 12.

Spring system 16 is in a rotational relationship with pulley member 14, center hub 22 and ribbon supply hub 44. Spring system 16 preferably includes a configuration set of three separate helically wound spring members 28, 30 and 32, each having looped ends 36 for engaging other spring ends or for attachment to pulley housing 12, as will be discussed in detail below. Spring members 28, 30 and 32 are sized to fit within outer periphery 18 and between annularly spaced walls 20 of pulley member 14. As shown in FIG. 1, a looped end 36 of spring member 32 is fixedly attached to pulley housing 12 through attachment hook 34. Spring system 16 may be coupled to pulley housing 12 by a variety of apparatus including but not limited to attachment hooks, detents, notches or clips. In the present embodiment, spring system 16 utilizes a configuration set having three separate spring members 28, 30 and 32; however, the present disclosure is also applicable to spring systems including one or more separate springs or elastic members fashioned in the same or similar manner described herein.

Figure 2B:
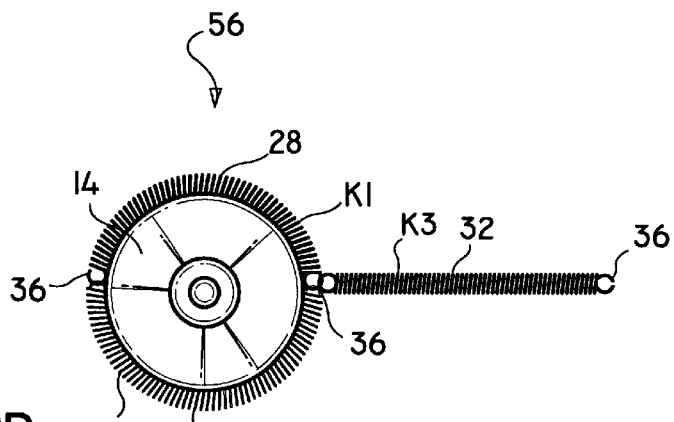
FIG. 2B is a plan view of the spring system according to the present disclosure configured to increase torque upon the pulley member.
Figure 2C:
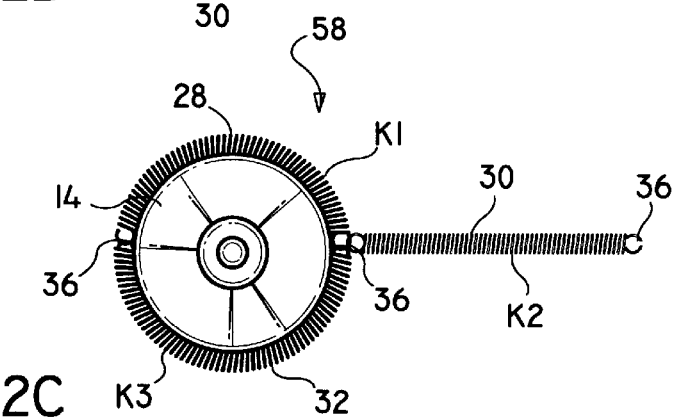
FIG. 2C is a plan view of the spring system according to the present disclosure configured to decrease torque upon the pulley member.

With particular reference to the spring system 16 as represented in FIGS. 1, 2B and 2C, three separate helically wound spring members 28, 30 and 32 are being utilized in a fashion which provides rotational force, i.e. torque, to pulley member 14 during rotation thereof. The use of three or more springs as part of the spring system 16 greatly increases the torque or degree of recoil imparted on pulley member 14 in both forward and reverse rotational directions. Each of spring members 28, 30 and 32 include looped ends 36 which include a loop of wire in an overlapping configuration which allows each loop end 36 to be joined to another looped end 36. In the present embodiment shown in FIGS. 1 and 2B, looped ends 36 of spring member 28 are attached to the looped ends 36 of spring member 30 along the outer periphery 18 of pulley member 14. In addition, corresponding looped ends 36 of spring members 28 and 30 are each coupled to a looped end 36 of spring member 32 while opposite looped end 36 of spring member 32 is anchored to attachment hook 34 of pulley housing 12. In this arrangement, the torque imparted onto pulley member 14 can be altered dependent upon the configuration of spring members 28, 30 and 32 and corresponding spring dimensions and spring constants K associated with any of spring members 28, 30 or 32.

With particular reference to FIGS. 1, 2B and 2C, the spring members 28, 30 and 32 of pulley tensioner 10 are arranged into two alternate configuration sets 56 and 58, although any number of sets may be configured since spring members 28, 30 and 32 can all be interchangeably coupled together. The springs or elastic members disclosed throughout the present disclosure vary according to various spring dimensions such as spring length, wire gauge, number of coils and spring constants K. As such, the present embodiments through configuration sets 56 and 58 include spring members 28, 30 and 32; each having different spring attributes including different spring lengths and different spring constants K1–K3, although spring or elastic members of equal attributes is also contemplated. Each configuration set 56 and 58 imparts a different torque force upon pulley member 14. The pulley tensioner 10, as shown in FIGS. 1 and 2B, imparts upon pulley member 14 an increase in torque or recoil when spring members 28 and 30 are attached in an end loop 36-to-end loop 36 fashion along outer periphery 18 of pulley member 14 with spring member 32 as an attachment spring member used to secure spring members 28 and 30 to attachment hook 34 of pulley housing 12. Similarly, but with a resulting decrease in torque or recoil to pulley member 14, FIG. 2C shows spring members 28 and 32 in an end loop 36-to-end loop 36 attachment along outer periphery 18 with spring member 30 as the attachment spring member. Dependent upon the configuration of spring members 28, 30 and 32, pulley member 14 experiences either an increase or decrease in rotational torque. The amount of torque or recoil imparted upon pulley member 14 is dependent on the particular spring dimensions including corresponding spring constants K attributable to the type of springs making up spring system 16. While any number of springs may be used to make up a configuration set of spring system 16 of the present disclosure, the above mentioned preferred embodiments utilize spring members 28, 30 and 32 coupled to one another in interchangeable fashion as is shown in FIGS. 1, 2B and 2C.

In another preferred embodiment, the individual spring members 28, 30 and 32 of spring system 16 are color coded or contain other indicia pertaining to respective length, dimension, force, spring constant K or other measurable attributes. In this manner, choice as to relevant configuration sets of spring members 28, 30 and 32 is made readily apparent. For instance, as is shown in FIG. 2A, spring members 28, 30 and 32 are color coded where S represents silver and Y represents yellow, although any color combination is contemplated. A color code, such as depicted in FIG. 2A, allows a user to readily recognize and configure respective configurations of the spring system 16 to achieve the desired increase or decrease in torque imparted upon pulley member 14.

Figure 5:
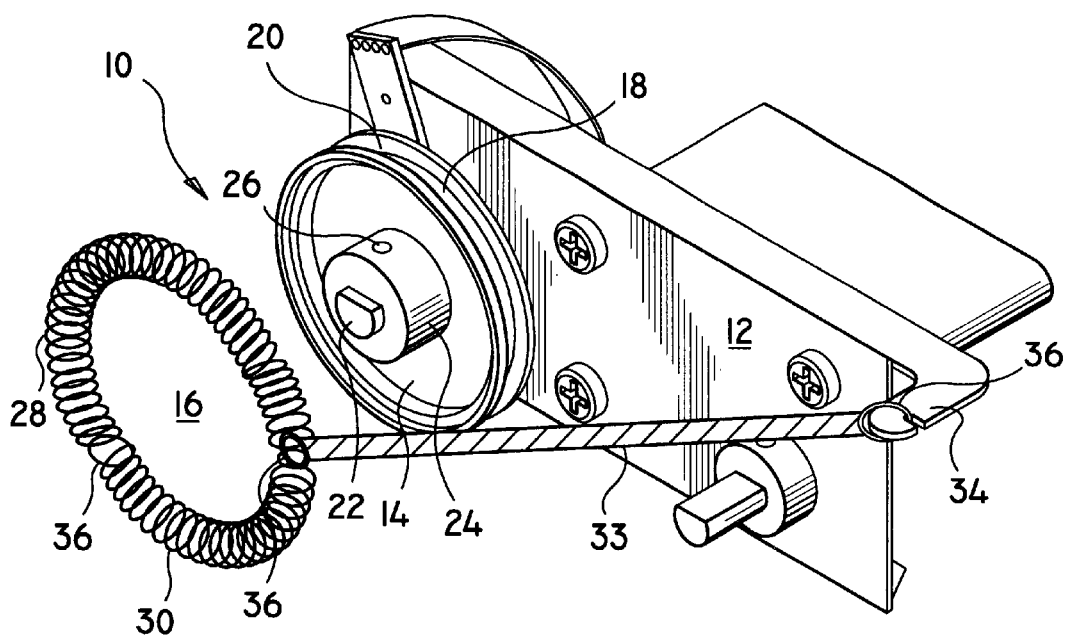
FIG. 5 is a perspective view of the pulley member of FIG. 1 with the novel torque adjustment structure including an alternate embodiment utilizing an attachment member.

In alternate embodiments, the spring system 16 of the present disclosure can include varying elastic, as well as, non elastic members. For instance, as shown in FIG. 5, spring system 16 may be fixedly attached to attachment hook 34 of pulley housing 12 with attachment member 33. Attachment member 33 may be constructed of elastic materials such as rubber products or spring-type metals. Attachment member 33 may also be constructed of inelastic materials such as cable, wire, rope and the like. Similarly, the entire spring system 16 may include individual spring members constructed of elastic materials other than helically wound spring members such as leaf springs, rubber members, spring-type metals and the like. It is also contemplated that attachment member 33 may include multiple spring, elastic or inelastic members.

Figure 3A:
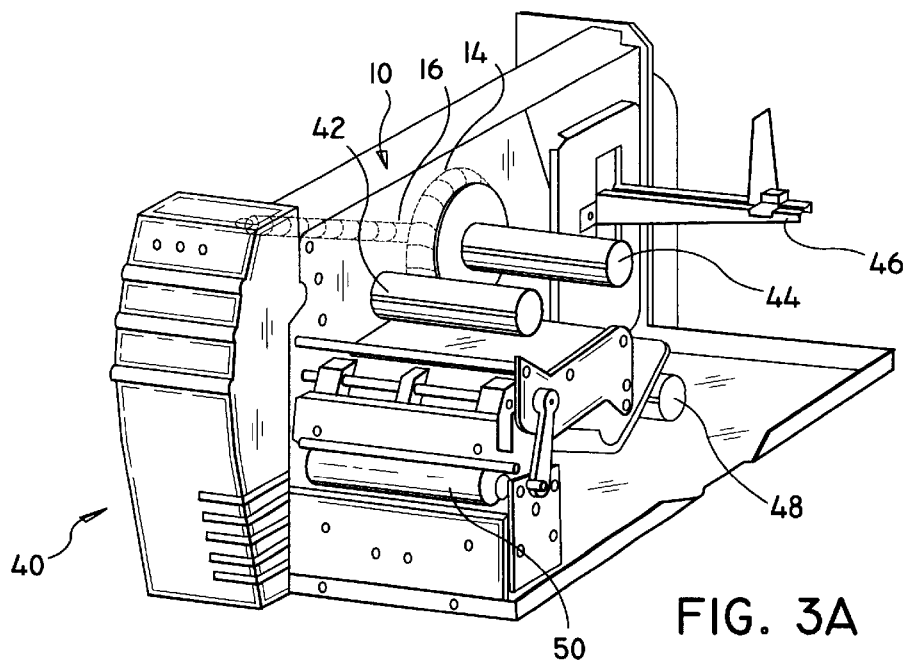
FIG. 3A is a perspective view illustrating the pulley tensioner according to the present disclosure being utilized in the printing apparatus.
Figure 3B:
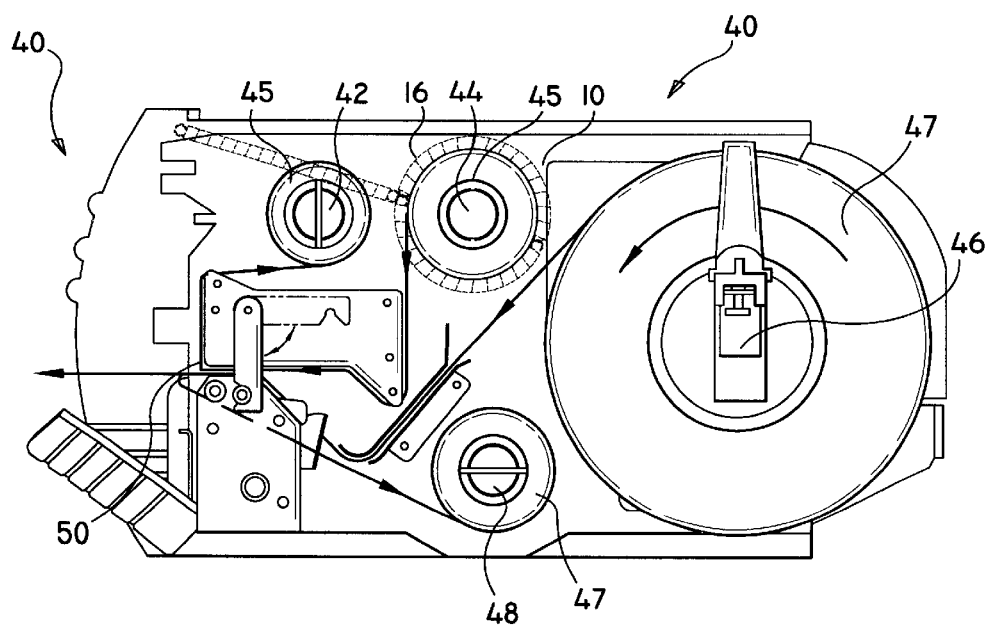
FIG. 3B is a perspective side view of FIG. 3A illustrating the pulley tensioner of the present disclosure being utilized in the printing apparatus.

With reference to FIGS. 3A and 3B, a preferred embodiment of pulley tensioner 10 according to the present disclosure is shown in conjunction with a printing apparatus 40. As is shown in phantom in FIGS. 3A and 3B, pulley tensioner 10 operates opposite ribbon supply hub 44. The pulley tensioner 10 of the present disclosure is specifically designed to provide rotational torque to ribbon supply hub 44. Printing apparatus 40 includes both ribbon supply hub 44 and media supply hub 46, as well as, ribbon rewind hub 42 and media rewind hub 48. In operation, printing apparatus 40 utilizes both media 47 and ribbon 45 supply to create a printed image or label. In that regard, both the media 47 and ribbon 45 must be drawn from their respective hubs 44, 46 through the printing head 50 and back into the take-up or rewind hubs 42, 48. In printing apparatus 40, the tension or rotational torque associated with ribbon supply hub 44 is an important feature of the printing process, in that, proper torque and tension results in less jamming or wrinkling of printing ribbon 45 when being wound or unwound from ribbon supply hub 44. Pulley tensioner 10 provides torque to ribbon supply hub 44 during both supplying (forward rotation) and rewinding (reverse rotation) of printing ribbon 45 through printing head 50. Specifically, the present embodiment is directed to providing rotational torque or recoil to ribbon supply hub 44, although it is contemplated that the present disclosure could also be applicable to media 47 and media supply hub 46 or any other similar hub or pulley arrangement.

With reference to FIGS. 2B, 2C and 4, a perspective view of printing apparatus 40 and pulley tensioner 10 according to the present disclosure is shown. Pulley housing 12, as well as, attachment hook 34 are fixedly attached to printer housing 41 and include through holes for the passage of ribbon supply hub 44 and ribbon rewind hub 42. Bracket 55 is used to space pulley housing 12 outwardly from printer housing 41 along ribbon supply hub 44 and ribbon rewind hub 42. Pulley 14 is attached to center hub portion 22 of ribbon supply hub 44 through a connecting assembly 52 including a series of bearings, washers and spacers, as is known in the art. Pulley tensioner 10 also includes sensor 53 for sensing the amount of ribbon being displaced by printing apparatus 40. Center hub portion 22 includes a tapered end portion having a flat surface for acceptance of annular collar 24 and set screw 26 for fixedly coupling pulley member 14 to center hub portion 22. As was previously described, pulley member 14 includes spring system 16 and a configuration set of spring members 28, 30 and 32 each having different spring dimensions and spring constants K1–K3. This set of spring members 28, 30 and 32 can alternatively be configured for either increasing (configuration set 56) or decreasing (configuration set 58) the amount of torque transferred from spring system 16 to pulley member 14.

In operation, the pulley tensioner 10 of the present disclosure can be specifically adjusted dependent on the degree of torque or recoil required with the particular ribbon 45 or media 47 being utilized within printing apparatus 40. Dependent upon the requirements of the particular printing process of printing apparatus 40, the torque imparted upon pulley member 14 can be easily adjusted by simple rearranging or replacing of a configuration set of springs making up spring system 16. Adjusting or fine tuning the amount of torque or recoil imparted upon pulley member 14 and consequently upon ribbon 45 is accomplished by several simple steps. First, the printer cover (not shown) is removed from printing apparatus 40 to thereby gain access to pulley tensioner 10. Second, the existing spring or elastic system is removed from pulley member 14 and pulley housing 12. Third, an alternate configuration set of springs or elastics having the desired torque effect is installed onto pulley member 14 and pulley housing 12. Examples of configurations sets are shown in FIGS. 1, 2B and 2C, although any other configuration set of springs or elastic materials is also contemplated. Lastly, the printer cover is replaced to complete the process.

As best seen in FIGS. 1, 2B–2C, and 5, the simple rearrangement of spring members 28, 30 and 32 can increase or decrease the torque imparted upon pulley member 14. Similarly, a substitution with attachment member 33 which can be constructed from a variety of materials, as described earlier, will also impart specific forces upon pulley member 14. As can be said with all configuration sets making up the spring systems associated with pulley tensioner 10, the actual torque forces imparted from the spring systems to pulley member 14 can be pre-calculated and known prior to installation of the particular spring system. This would give a user of pulley tensioner 10 the ability to choose the specific amount of torque or recoil needed for a particular printing process.

The aforementioned embodiments describe pulley tensioner 10 in use with printing apparatus 40; however, the present disclosure is also applicable with other systems or apparatus requiring the use of a pulley tensioner system requiring adjustable torque or recoil response.

It will be understood that various modifications may be made to the embodiments disclosed herein. For example, the pulley tensioner of the present disclosure may also be used with multiple pulley configurations and multiple spring systems. Therefore, the above description should not be construed as limiting, but merely as exemplifications of preferred embodiments. Those skilled in the art will envision other modifications within the scope and spirit of the claims appended hereto.

What is claimed is:

1. A pulley tensioner for applying torque to a pulley comprising:
   a pulley rotatably coupled to a pulley housing;
   the pulley being torsionally acted upon by a spring system;
   the spring system encircling an entire periphery of the pulley and including at least one spring; and
   the spring system being attached to the pulley housing by an attachment member, wherein the attachment member is in direct contact with the at least one spring.

2. The pulley tensioner according to claim 1, wherein the spring system includes at least two springs.

3. The pulley tensioner according to claim 1, wherein the attachment member is an elastic member.

4. The pulley tensioner according to claim 2, wherein the attachment member is an attachment spring and is coupled to the at least two springs.

5. The pulley tensioner according to claim 2, wherein the at least two springs are coupled in an end-to-end fashion along the periphery of the pulley.

6. The pulley tensioner according to claim 4, wherein the at least two springs and the attachment spring are all interchangeably coupled together.

7. A pulley tensioner for applying torque to a pulley comprising:
   a pulley rotatably coupled to a pulley housing;
   the pulley being torsionally acted upon by a spring system;
   the spring system encircling an entire periphery of the pulley and including a plurality of springs each having two spring ends; and
   the spring system being attached to the pulley housing by an attachment member, wherein the attachment member is in contact with at least two of the spring ends and the spring system is configured to increase the degree of recoil on the pulley independent of the direction of rotation of the pulley.

8. The pulley tensioner according to claim 7, wherein the attachment member is an elastic member.

9. The pulley tensioner according to claim 7, wherein the attachment member is an attachment spring and is coupled to the plurality of springs.

10. The pulley tensioner according to claim 7, wherein the plurality of springs are coupled in an end-to-end fashion along the entire periphery of the pulley.

11. The pulley tensioner according to claim 9, wherein the plurality of springs and the attachment spring are all interchangeably coupled together.

12. A pulley tensioner for applying torque to a pulley comprising:

a pulley rotatably coupled to a pulley housing;

the pulley being torsionally acted upon by a spring system, the spring system being configured to provide a torsional force on the pulley independent of the direction of rotation of the pulley;

the spring system substantially encircling an entire periphery of the pulley and including a plurality of interchangeable springs; and the spring system being attached to the pulley housing by one of the plurality of springs such that at least one spring of the spring system substantially encircling the periphery of the pulley is in direct contact with at least one spring of the spring system attached to the pulley housing.

13. The pulley tensioner according to claim 12, wherein the plurality of interchangeable springs includes at least three springs.

14. The pulley tensioner according to claim 12, wherein each spring of the plurality of springs is coupled to at least two springs of the plurality of springs.

* * * * *